US007568186B2

(12) United States Patent
Bhattacharya

(10) Patent No.: US 7,568,186 B2
(45) Date of Patent: Jul. 28, 2009

(54) EMPLOYING A MIRROR PROBE HANDLER FOR SEAMLESS ACCESS TO ARGUMENTS OF A PROBED FUNCTION

(75) Inventor: Suparna Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/147,828

(22) Filed: Jun. 7, 2005

(65) Prior Publication Data

US 2006/0277540 A1 Dec. 7, 2006

(51) Int. Cl.
*G06F 9/44* (2006.01)
*G06F 9/45* (2006.01)

(52) U.S. Cl. .................. 717/130; 717/124; 717/127; 717/128; 717/129; 717/138

(58) Field of Classification Search ......... 717/124–135, 717/138; 703/26
See application file for complete search history.

(56) References Cited

U.S. PATENT DOCUMENTS

| | | | | |
|---|---|---|---|---|
| 6,175,916 | B1 * | 1/2001 | Ginsberg et al. | 712/228 |
| 6,351,843 | B1 * | 2/2002 | Berkley et al. | 717/128 |
| 6,708,326 | B1 | 3/2004 | Bhattacarya | |
| 6,996,808 | B1 * | 2/2006 | Niewiadomski et al. | 717/130 |
| 7,013,456 | B1 * | 3/2006 | Van Dyke et al. | 717/130 |
| 7,143,396 | B2 * | 11/2006 | Suresh | 717/130 |
| 7,305,661 | B1 * | 12/2007 | Leventhal et al. | 717/128 |
| 7,389,494 | B1 * | 6/2008 | Cantrill | 717/125 |
| 2002/0029374 | A1 | 3/2002 | Moore | |
| 2002/0087949 | A1 * | 7/2002 | Golender et al. | 717/124 |
| 2003/0041316 | A1 | 2/2003 | Hibbeler et al. | |
| 2003/0056200 | A1 | 3/2003 | Li et al. | |
| 2003/0149960 | A1 | 8/2003 | Inamdar | |
| 2004/0003375 | A1 | 1/2004 | George et al. | |
| 2004/0059962 | A1 | 3/2004 | Robertsson | |
| 2005/0283676 | A1 * | 12/2005 | Begg et al. | 714/38 |

(Continued)

OTHER PUBLICATIONS

Agrawal et al., "Debugging with Dynamic Slicing and Backtracking", Excerpt from "Software—Practice and Experience" vol. 23(6), John Wiley & Sons, 1993, pp. 589-616.*

(Continued)

*Primary Examiner*—Wei Y Zhen
*Assistant Examiner*—Ryan D Coyer
(74) *Attorney, Agent, or Firm*—Schmeiser, Olsen & Watts; William H. Steinberg

(57) ABSTRACT

A method and system for accessing, from a mirror probe handler, a value to be associated with an argument of a function. The mirror probe handler and the function are defined with identical prototypes and compiled with identical linkage conventions. The mirror probe handler is executed after initiating execution of the function, executing a probe placed in the function, and saving a state of processor registers. While executing the mirror probe handler, a reference to an argument of the mirror probe handler seamlessly accesses the value via automatically employing at least one of the processor registers. The access is facilitated by the identical prototypes and the compilations with identical linkage conventions. After the reference accesses the value, the saved state is restored, which facilitates the execution of the function, which was temporarily replaced by the execution of the probe and mirror probe handler.

28 Claims, 8 Drawing Sheets

U.S. PATENT DOCUMENTS

2006/0218537 A1* 9/2006 Aroya ................. 717/130
2007/0103175 A1* 5/2007 Eigler ................. 324/754

OTHER PUBLICATIONS

Cheung et al., "A Framework for Distributed Debugging", IEEE, 1990, pp. 106-115.*
Dasgupta, Partha, "A Probe-Based Monitoring Scheme for an Object-Oriented Distributed Operating System"; ACM, 1986, pp. 57-66.*
http://www.usenix.org/events/osdi99/full_papers/tamches/tamches.pdf Tamches, Ariel and Barton P. Miller; Fine-Grained Dynamic Instrumentation of Commodity Operating System Kernels; Proceedings of the Third Symposium on Operating Systems Design and Implementation (OSDI '99); pp. 117-130; New Orleans, LA; Feb. 1999.
http://www.dyninst.org/papers/apiPreprint.pdf Buck, Bryan, Hollingsworth, Jeffrey K; An API for Runtime Code Patching; International Journal of High Performance Computing Applications; vol. 14; No. 4; 317-329 (2000); SAGE Publications.
http://www.cs.umd.edu/~hollings/papers/ipdps01.pdf DeRose, Luiz, Hoover, Ted, Hollingsworth, Jeffrey K. The Dynamic Probe Class Library—An Infrastructure for Developing Instrumentation for Performance; Proceedings of the 15th International Parallel and Distributed Processing Symposium (IPDPS 2001); 10066b; San Francisco, CA; Apr. 2001.
http://sourceware.org/systemtap/kprobes/docs/dprobes/1ca03/dprobes-1ca2003.pdf Moore, R.J., Vamsikrishna, S., Bhattacharya, S.; Dynamic Probes—Debugging by Stealth; presentation at Linux. Conf.Au; Jan. 2003.
http://www.sun.com/bigadmin/content/dtrace/dtrace_usenix.pdf Cantrill, Bryan M., Shapiro, Michael W., and Leventhal, Adam H.; Dynamic Instrumentation of Production Systems; Proceedings of the USENIX Annual Technical Conference (USENIX '04); 15-28; Boston, MA; Jun. 2004.

* cited by examiner

US 7,568,186 B2

EMPLOYING A MIRROR PROBE HANDLER FOR SEAMLESS ACCESS TO ARGUMENTS OF A PROBED FUNCTION

BACKGROUND OF THE INVENTION

1. Technical Field

The present invention relates to accessing arguments of a probed function, and more particularly to employing a mirror probe handler for seamless access to arguments of a probed function.

2. Related Art

Dynamic probing techniques (e.g., Dprobes, Dynamic Probe Class Library (DPCL), KernInst, Dyninst, and Dtrace) allow on-the-fly interception of a running executable program by planting probes at specified addresses in the program's instruction (or data) stream (e.g., by planting breakpoints or by dynamic code patching), and specifying custom probe handlers to run when those probe points are reached (i.e., hit) during execution. Typical applications of probes include monitoring of specific arguments, ad-hoc tracing of code paths, custom monitoring of system state, tracking complex problems on a live system, debugging timing sensitive problems, fault-injection and dynamic assertion checking. Probe handlers are typically written either in a custom language and interpreted by pre-linked probe handling logic invoked on a probe hit, or in standard programming languages (e.g., C or assembly), and loaded in as object code. Since the probe handler code is outside of the scope of the function being probed, the probe handler cannot refer to arguments of the probed function the way one would do when adding code inline. Instead, special language constructs or interfaces are provided for the probe handler to access function arguments and in some cases, local variables. Implementing these constructs or interfaces requires complex coding related to code analysis, interpretation of debug information, and/or architecture-specific and Application Binary Interface (ABI)-specific knowledge of the compiler's layout of the arguments and calling conventions. Thus, there is a need for an improved technique for accessing arguments of a probed function.

SUMMARY OF THE INVENTION

The present invention provides a programmer with a lightweight and minimal technique (i.e., the required coding is minimal) for custom monitoring of specific routines in a running program (e.g., operating system kernel) via dynamic probes, without the need for code analysis, debug information interpretation, architecture-specific and ABI-specific knowledge, and special-purpose compilation and language.

DETAILED DESCRIPTION OF THE INVENTION

The present invention provides a novel technique for on-the-fly access of values to be associated with arguments of a function when a running program (e.g., an operating system) including the function is being monitored and/or debugged. A routine is added into the running program to enable seamless referencing of arguments of the function from the added routine, just as if the added routine's code were part of the scope of the function. The details of this process are described below relative to FIGS. 1-5.

Figure 1:
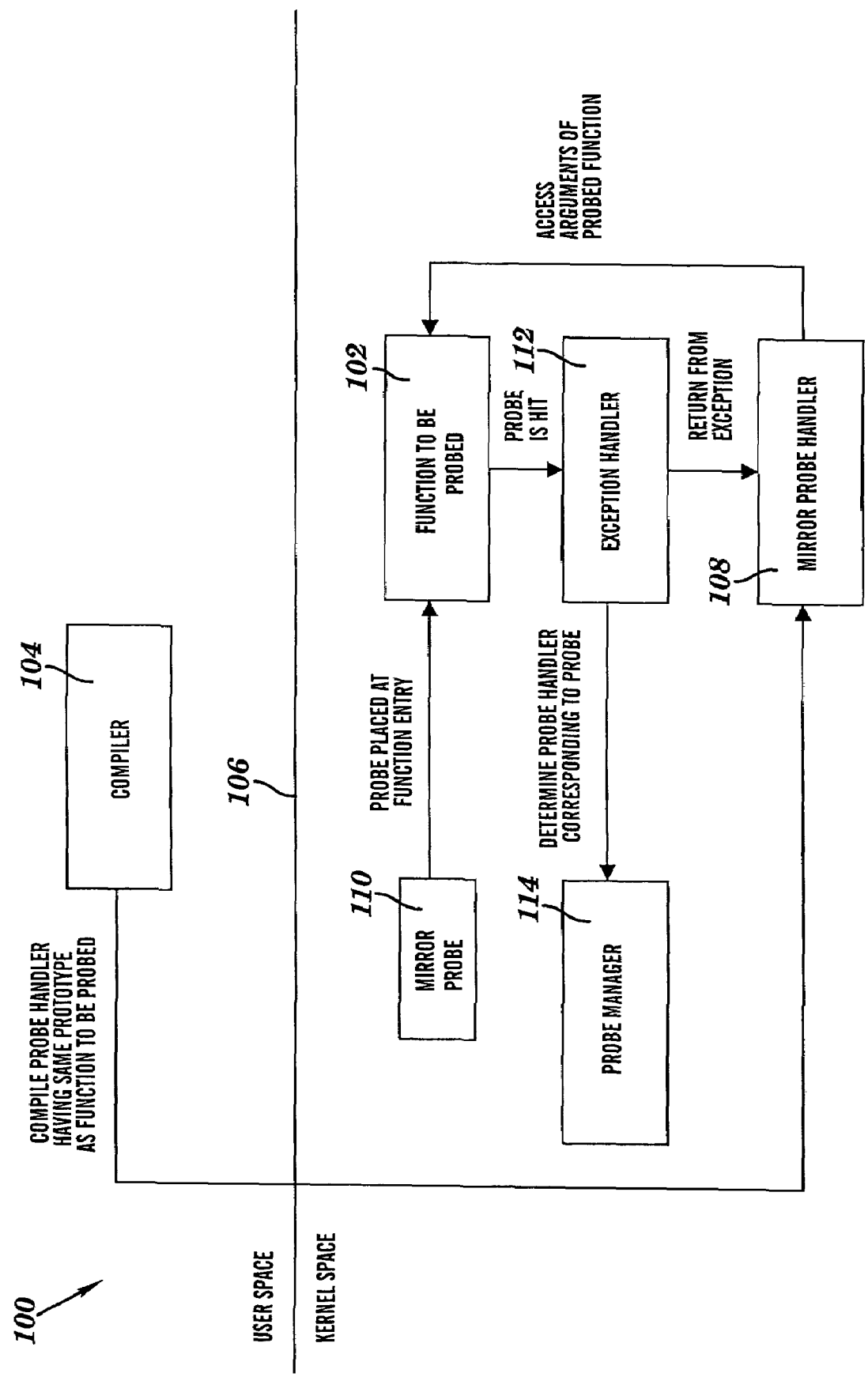
FIG. 1 is a block diagram of a system including an operating system environment for employing a mirror probe handler to access arguments of a probed function, in accordance with embodiments of the present invention.

FIG. 1 is a block diagram of a system including an operating system environment for employing a mirror probe handling routine to access arguments of a probed function, in accordance with embodiments of the present invention. System 100 includes a function to be probed 102 residing in a kernel space and a compiler 104 residing in a user space. As used herein, a function is defined as a sequence of instructions in a computing program for performing a particular task. A function in the computing environment of the present invention is also known as a routine, procedure, subprogram, module, or subroutine. As used herein, a "function to be probed" is defined as a function that includes one or more arguments and/or one or more local variables that are to be logged, tracked or otherwise monitored. An argument is a value passed into the function by, for example, an instruction that calls the function. A local variable included in a function is a named memory location that is associated with a scope. The scope of the local variable is fixed at compile time to be a region in source code that includes the local variable's declaration. The local variable is accessible only from within this fixed region. Accessing an argument, as used herein, is defined as accessing a value associated with, or a value to be associated with, an argument of a function or routine.

As used herein, kernel space is a memory address space in which an operating system kernel runs. A kernel manages resources of a computing system, including providing to user application programs secure access to computing hardware. As used herein, a user space is a memory address space in which user application programs run. An operating system running in kernel space and a program running in user space differ, for example, in their respective privilege levels associated with accessing system resources, in the distinct portions of virtual memory each can access, and in the particular page table each uses to map virtual memory addresses to physical memory addresses. In system 100, the user and kernel spaces are demarcated by a line 106.

Function to be probed 102 is defined by a prototype associated with one or more arguments of function 102. As used herein, a prototype is defined as a declaration of a function to a compiler that indicates a return value and one or more arguments of the function, as well as types associated with the return value and the one or more arguments.

A mirror probe handler 108 (i.e., a mirror probe handling routine) is a routine executed in response to execution of a mirror probe 110. Mirror probe handler 108 is defined with the same prototype as function to be probed 102. The prototype defining mirror probe handler 108 is associated with one or more arguments of the mirror probe handler. The term "mirror probe handler" includes "mirror" because at least its prototype matches or is a "mirror" of the prototype of function 102. In an alternate embodiment discussed below relative to FIGS. 4A-4B, the entire function is copied or "mirrored" in a mirror probe handler. During compile time, compiler 104 compiles mirror probe handler 108. The effect of compiling the mirrored prototype is described in more detail below relative to FIGS. 2A-2B. Mirror probe handler 108 is generated by, for example, a kernel developer and placed in a program (e.g., operating system) running in the kernel space.

As used herein, a mirror probe is defined as a dynamic probe of a special type which is associated with a mirror probe handler. A dynamic probe is defined as at least one instruction that provides for on-the-fly interception of a running executable program, wherein additional actions are performed in response to the interception. These additional actions can include program monitoring and/or debugging activities such as logging arguments, ad hoc tracing of code paths, custom monitoring of system state, and fault injection. Mirror probe 110 specifies an address in a program's instruction stream, wherein the specified address is associated with function 102. As used herein, a mirror probe is "hit" when the address specified by the mirror probe is reached during execution of the program. In response to mirror probe 110 being hit, mirror probe handler 108 is executed. The term "mirror probe" includes the word "mirror" because it is associated with the execution of a mirror probe handler when the mirror probe is hit.

In the preferred embodiment, mirror probe 110 is an instruction placed at the address of the entry point of function 102, thereby providing at least part of a temporary replacement for the instruction originally at the address of the entry point of function 102. The replaced instruction is, for instance, stored in a buffer for subsequent retrieval. In response to hitting mirror probe 110, probing actions begin with, for example, an execution of an exception handler 112 (i.e., exception handler routine). Exception handler 112 employs probe manager 114 (e.g., a software module) to determine a mirror probe handler that corresponds to the mirror probe that was hit. In FIG. 1, probe manager 114 determines that mirror probe handler 108 corresponds to mirror probe 110.

Exception handler 112 modifies a program counter state (not shown) in a stack frame to point to the beginning of mirror probe handler 108. As used herein, a program counter is an instruction address register of a processor that stores the address of the current or next instruction. One example of a program counter is the EIP instruction pointer register of a Pentium processor. A stack frame is a data structure that temporarily stores local variables, arguments and register contents for a routine. Mirror probe handler 108 is executed, for example, upon returning from exception handler 112. During its execution, mirror probe handler 108 is able to seamlessly access one or more values, each value to be associated with an argument of the one or more arguments of probed function 102, as if code of the probe handler was part of the scope of probed function 102, while avoiding the need for code analysis, debug information interpretation, architecture-specific and ABI-specific knowledge, and special purpose compilation or language. After probing actions are completed in the execution of mirror probe handler 108, stack and program counter states are restored to saved values, so that execution switches back to probed function 102. A more detailed description of the preferred embodiment of the argument access process is discussed below relative to FIGS. 2A-2B.

Figure 2A:
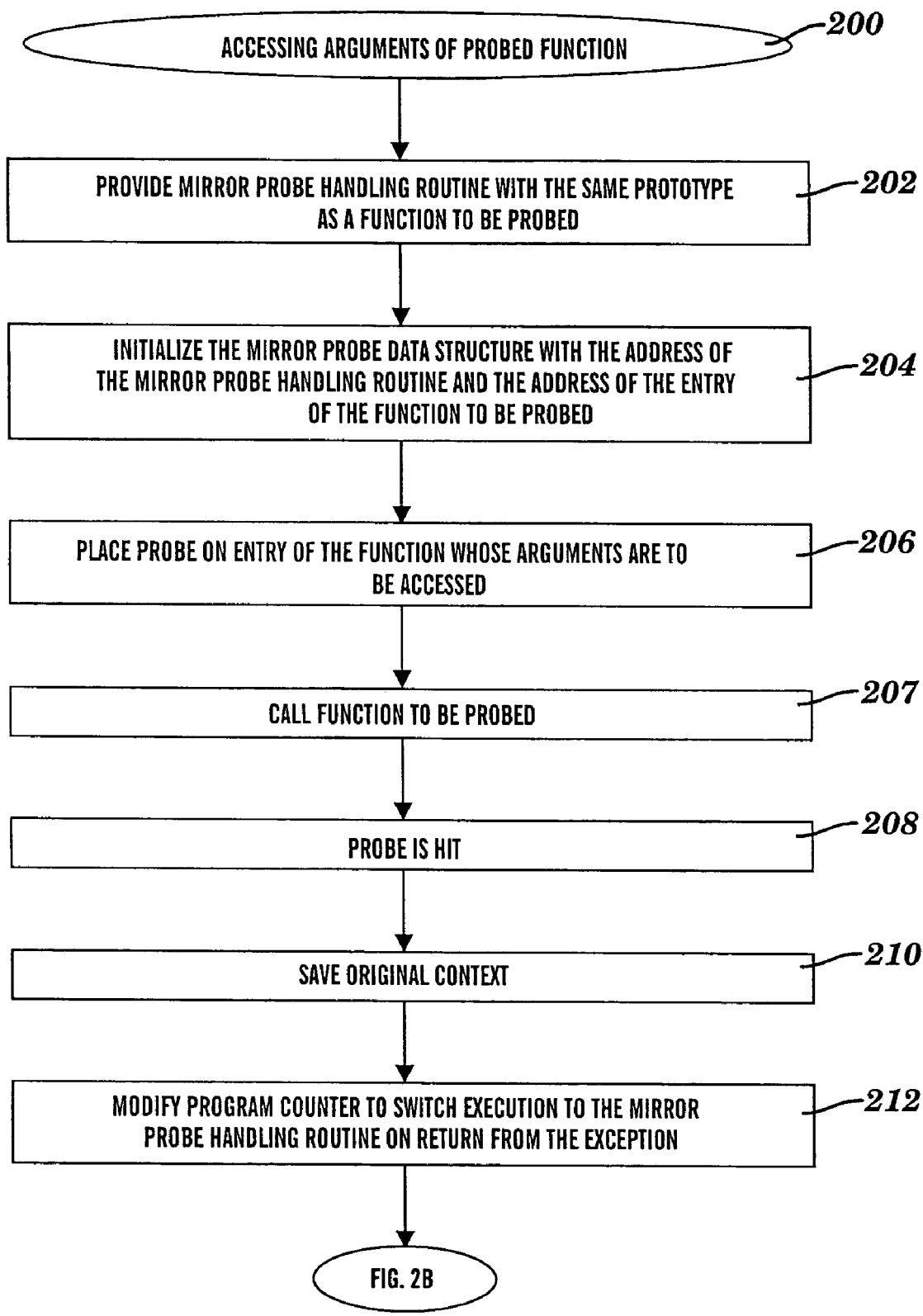
FIGS. 2A-2B illustrate a flow chart of logic for employing a mirror probe handler to access arguments of a probed function for the system of FIG. 1, in accordance with embodiments of the present invention.
Figure 2B:
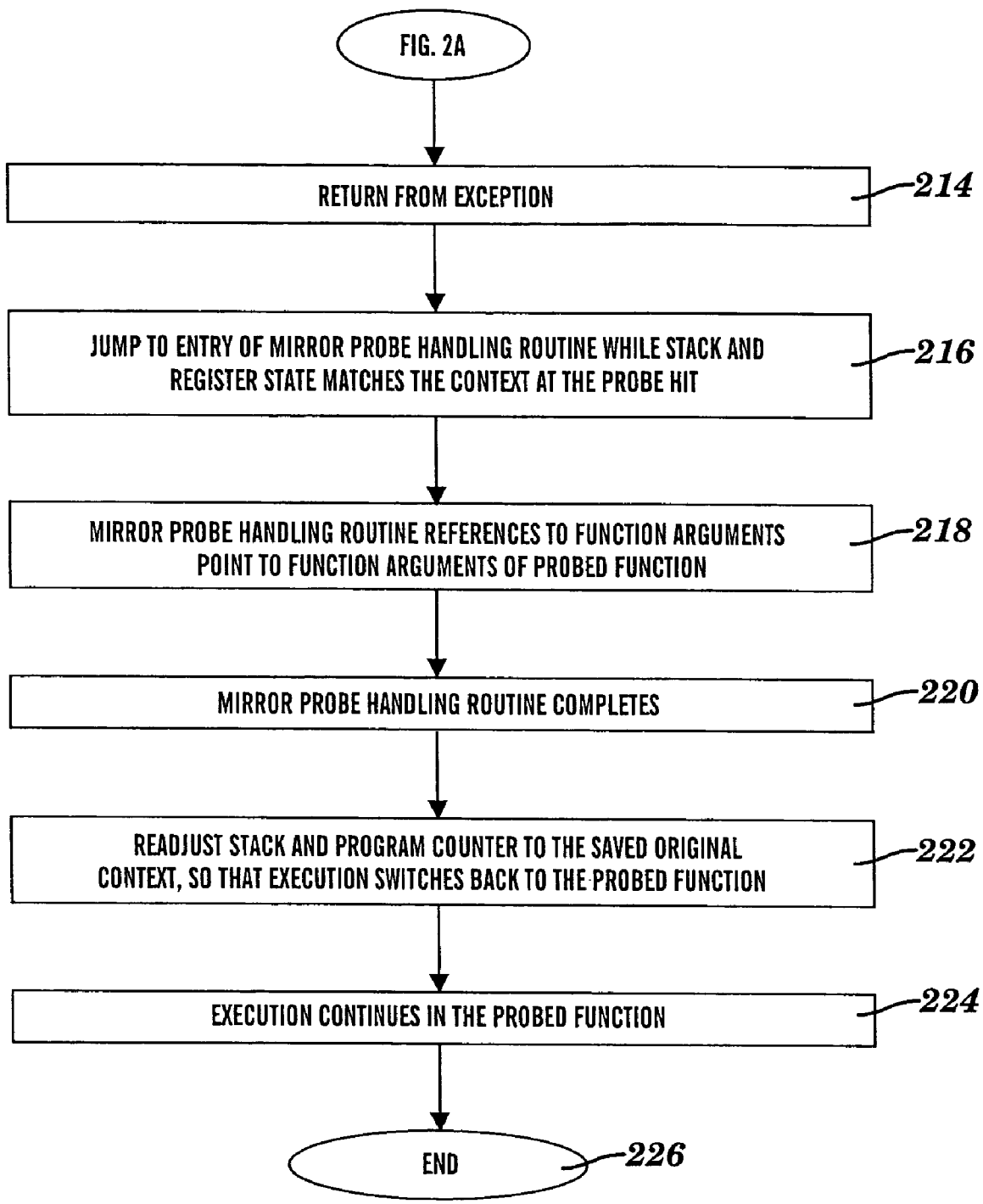

FIGS. 2A-2B illustrate a flow chart of logic for employing a mirror probe handler to access arguments of a probed function for the system of FIG. 1, in accordance with embodiments of the present invention. When the logic of the argument access process begins at step 200, function to be probed 102 (see FIG. 1) is already provided in a running program, which is being executed by a processor whose registers facilitate access to one or more arguments of the function to be probed. For example, prior to step 200, function 102 (see FIG. 1) is already provided within an operating system kernel or kernel extension. In step 202, a mirror probe handling routine 108 (see FIG. 1) is provided and is defined by the same prototype as the prototype that defines the function to be probed 102 (see FIG. 1). Because the mirror probe handling routine 108 (see FIG. 1) mirrors the prototype of function 102 (see FIG. 1), the one or more arguments of the mirror probe handling routine are in one-to-one correspondence with the one or more arguments of the function to be probed. This correspondence includes a matching of argument identifier and argument type, and, if there are multiple arguments listed in the prototype, a matching of placement in the order in which arguments are listed in the prototype.

Further, mirror probe handling routine 108 (see FIG. 1) is compiled with compiler 104 (see FIG. 1), which employs calling and linkage conventions identical to the conventions employed by the compilation of the function to be probed, and as a result, generates code associated with argument access that is similar to code generated (prior to step 200) by the compilation of the function to be probed. As the compilations of the common prototypes of the mirror probe handling routine and the function to be probed both obey the same ABI, the compiler-generated layout of their respective sets of one or more arguments are the same. For example, if a stack-based architecture is employed, compilation of mirror probe handling routine 108 (see FIG. 1) with the same prototype as function to be probed 102 (see FIG. 1) provides offsets to be used for accessing, on a stack, values to be associated with arguments of the mirror probe handling routine. In this example, the offsets associated with mirror probe handling routine 108 (see FIG. 1) are identical to offsets associated with function to be probed 102 (see FIG. 1), which are to be used for accessing the one or more arguments of function 102 (see FIG. 1), and which were provided via compilation of function 102 (see FIG. 1).

Providing the mirror probe handler as described relative to step 202 facilitates seamless access to an argument of a function in part by taking advantage of a programmer's high-level awareness of the arguments and source code of the function whose argument is to be accessed, as well as the above-described compilation providing the same argument layout for routines that have the same prototype.

An example of function 102 (see FIG. 1) whose arguments are to be probed is presented by the following code:

```
ssize_t __blockdev_direct_IO(int rw, struct kiocb *iocb, struct inode
*inode, struct block_device *bdev, const struct iovec *iov, loff_t offset,
unsigned long nr_segs, get_blocks_t get_blocks, dio_iodone_t end_io,
int needs_special_locking)
{
    int seg;
    ssize_t size;
    /*... other code to perform direct I/O operation is inserted here */
}
```

The following code is an example of mirror probe handling routine 108 (see FIG. 1) that accesses the values to be passed to the arguments of the function presented above:

```
ssize_t
mirror_func (int rw, struct kiocb *iocb, struct inode *inode,
        struct block_device *bdev, const struct iovec *iov, loff_t offset,
        unsigned long nr_segs, get_blocks_t get_blocks,
        dio_iodone_t end_io,
        int needs_special_locking)
{
    mirror_start( );
    printk("___blockdev_direct_IO: %s, ino %lu offset %llu,
    iov_len %d\n",
        (rw == READ) ? "READ": "WRITE",
        (inode != NULL) ? inode->i_ino : 0,
        offset, (nr_segs && iov) ? iov[0].iov_len : 0);
    if (bdev == NULL)
        printk("Bogus device\n");
    mirror_return( );
}
```

In step 204, a data structure associated with mirror probe 110 (see FIG. 1) and mirror probe handling routine 108 (see FIG. 1) are supplied to the kernel in a module. The mirror probe data structure is initialized with a memory address of mirror probe handling routine 108 (see FIG. 1) and a memory address of the entry point of the function to be probed 102 (see FIG. 1). The following code is an example of implementing step 204, wherein .addr is initialized with the address of the entry of the function to be probed, and .entry is initialized with the address of the entry of the mirror probe handling routine:

```
static struct mirror_probe my_mirror_probe = {
    {.addr = (kprobe_opcode_t *)___blockdev_direct_IO},
    .entry = (kprobe_opcode_t *)mirror_func
    }
```

In step 206, mirror probe 110 (see FIG. 1) is placed in a running program at the address of the entry point of function to be probed 102 (see FIG. 1). Placing or inserting the mirror probe refers to employing the mirror probe to specify a memory address such that when the specified address is reached or detected during execution of a program, the execution of the program is interrupted or redirected so that additional actions can be performed. For example, a mirror probe is a breakpoint instruction placed at a memory address, which replaces an instruction associated with the entry point of function 102 (see FIG. 1). In this example, the replaced instruction is stored and subsequently retrieved to allow the probed function to resume execution (see step 224 below). A breakpoint is a point in an execution of a program which, when reached during execution, causes a temporary halt of the execution. Breakpoint insertion is one example of a probe insertion technique, and is described in more detail in U.S. Pat. No. 6,708,326, entitled "Method, System and Program Product Comprising Breakpoint Handling Mechanism for Debugging and/or Monitoring a Computer Instruction Sequence," which is hereby incorporated herein by reference, in its entirety. Step 206 can also be implemented by other, non-breakpoint techniques such as dynamic code patching, which is described below. An example of a mirror probe insertion in step 206 is presented by the following code:

```
int register_mirror_probe(struct mirror_probe *p)
{
    ...
    /* Add the mirror probe structure to a hash table which can be used
    to find the mirror probe corresponding to the addr */
    hlist_add_head(&p->hlist, &probe_table[hash_ptr(p->addr,
    KPROBE_HASH_BITS)]);
    /*Save original instruction at the addr where probe is to be placed*/
    p->opcode = *p->addr;
    /* Place an instruction breakpoint at the addr */
    *p->addr = BREAKPOINT_INSTRUCTION;
    flush_icache_range((unsigned long) p->addr, (unsigned long)
    p->addr + sizeof(kprobe_opcode_t));
    ...
}
```

In step 207, an execution of function to be probed 102 (see FIG. 1) is initiated by a calling instruction being executed by a processor. The function to be probed is called from, for example, an instruction in the running operating system kernel. This function call in step 207 provides one or more values, each of which is to be associated with an argument of the one or more arguments of function to be probed 102 (see FIG. 1). The function call in step 207 also provides at least part of a state of processor registers that can be employed to access the value of an argument of the function being called. In response to the calling instruction being executed in step 207, the function's return address is saved on the stack, the stack pointer is updated accordingly, and the program counter is loaded with the address of the mirror probe. In step 208, the mirror probe, which was placed at the entry point of function to be probed 102 (see FIG. 1) is hit in the execution stream in response to the function call in step 207. Upon hitting the mirror probe, probing actions begin with an execution of one or more instructions comprising the mirror probe. In response to executing the mirror probe, the mirror probe handler is to be executed, as described below. One or more other instructions or routines can be executed in response to the mirror probe execution and prior to the mirror probe handler execution. For example, an execution of the operating system's exception handler routine 112 (see FIG. 1) is executed in response to executing the mirror probe. The exception handler is, for instance, a breakpoint handler that looks up a mirror probe, as shown in the following code:

```
static int breakpoint_handler (struct pt_regs *regs)
{
    ...
    if ((my_mirror_probe = find_probe_at(addr)) !=
    NULL); /* looks up mirror probe */
    {
        /* handle mirror probe processing */
        ...
    }
    /* other kinds of breakpoint processing */
}
```

In step 210, the context (i.e., state) of the processor when the probe is hit is saved by, for example, the exception handler. This context or state includes the contents of the processor's stack, program counter, and one or more other registers used for accessing arguments. Depending on the ABI, certain architectures (e.g. PowerPC) or architectures with certain linkage conventions pass arguments through the aforementioned one or more other registers, if available, before utilizing the stack for passing arguments. Hereinafter, the state of the stack, program counter and the one or more other registers at the time of the mirror probe hit is referred to as the original context. An example of code that saves the original context of the processor is:

```
mirror_probe_saved_regs = *regs;
mirror_probe_saved_esp = ®s->esp;
```

It will be apparent to those skilled in the art that refinements of the context-saving code presented above can be employed to address symmetric multiprocessing (SMP) environments.

In step 212, the program counter is modified by, for example, the exception handler so that execution is switched to the mirror probe handling routine (e.g., upon returning from the exception handler routine). For example, the program counter is modified to include an address of the entry of the mirror probe handling routine. The following code provides an example of implementing step 212:

```
regs->eip = (unsigned long) (my_mirror_probe->entry);
```

The argument access process continues in FIG. 2B. In step 214, execution returns from the exception handler. The following code is an example of implementing step 214:

```
iret;
```

Because the program counter was modified in step 212, execution jumps in step 216 to the entry of mirror probe handling routine 108 (see FIG. 1), while the state of the stack and the one or more other registers matches the original context (i.e., the context of the processor at the time the mirror probe was hit). The following code is an example of implementing step 216:

```
ssize_t
mirror_func (int rw, struct kiocb *iocb, struct inode *inode,
        struct block_device *bdev, const struct iovec *iov, loff_t offset,
        unsigned long nr_segs, get_blocks_t get_blocks, dio_iodone_t
end_io,
        int needs_special_locking)
{
    mirror_start( );
    ...
}
```

The mirror probe handling routine begins executing in response to the mirror probe execution and, in one embodiment, in response to the execution of and return from the exception handler. The execution of the mirror probe handling routine and the execution of the mirror probe temporarily replace the execution of function 102 of FIG. 1. During the execution of the mirror probe handling routine, a reference made in step 218 by mirror probe handling routine 108 (see FIG. 1) to an argument of the mirror probe handling routine points to an argument of function 102 (see FIG. 1) and automatically accesses the contents of the stack and/or the one or more other registers, as they were saved in step 210. This access to the saved contents of the stack and/or the other register(s) provides access to a value of the one or more values passed by the calling instruction in step 207. The access to the registers described above is automatic in that the access is responsive to a reference of an argument of the mirror probe handling routine without depending upon code analysis, interpretation of debug information, or architecture-specific and ABI-specific knowledge of argument layout and calling conventions. This automatic access is a result of the code of mirror probe handling routine 108 (see FIG. 1) being compiled with a prototype and linkage conventions that are identical to the prototype and linkage conventions of function 102 (see FIG. 1). By employing the register state of the original context at the time the mirror probe handling routine executes, the value accessed in step 218 is the same value that would have been associated with an argument of function 102 (see FIG. 1) had the probe not been placed in step 206, and which will be so associated during the execution of the function in step 224 (described below).

For example, if a stack-based argument passing convention is employed, the mirror probe handler's reference to one of its arguments employs the offset described above relative to the stack saved in the original context of step 210 in order to access a value to be associated with an argument of the function being probed. As used herein, a function being probed and a probed function refer to function 102 (see FIG. 1) while the mirror probe handling routine is being executed and after the mirror probe handling routine has completed executing, respectively. The referencing in step 218 allows code of a mirror probe handling routine to seamlessly access the value of an argument of a function being probed, as if the mirror probe handling routine statements were part of the scope of the function being probed.

In the following example of statements in the mirror probe handling routine, references to the "bdev" and "inode" arguments of the mirror probe handling routine access the values of the "bdev" and "inode" arguments, respectively, of the function being probed. In this example, the values of the inode number and the offset, and the size of the I/O request are logged. Further, in the following example, if bdev is NULL, an alert is generated. The inode and bdev arguments are referenced in the following example in the same way they would be referenced from within the scope of function 102 (see FIG. 1).

```
printk("__blockdev_direct_IO: %s, ino %lu offset %llu,
iov_len %d\n",
        (rw == READ) ? "READ": "WRITE",
        (inode != NULL) ? inode->i_ino : 0,
        offset, (nr_segs && iov) ? iov[0].iov_len : 0);
if (bdev == NULL)
        printk("Bogus device\n");
```

In step 220, execution of the mirror probe handling routine ends and the probing actions are completed. At this point, execution needs to continue in the probed function. Before such execution in the probed function can resume, side effects of the probing actions described above (e.g., stack changes caused by the execution of the mirror probe handler) are cleaned up. To clean up these side effects, the contents of the stack, program counter and the one or more other registers are restored to the state of the original context saved in step 210. Such restoration takes place in step 222, and is the equivalent of employing the Linux/ljnix command longjmp to jump to a saved context. In one embodiment, this jump back to the function code and context includes (1) using the saved original context values to set the stack pointer back to where it was on entry to the mirror probe handler; (2) forcing a second execution of an exception handler; and (3) replacing the current context on the stack with the saved original context so that the original context takes effect on return from the exception. In another embodiment, the jump back to the function code is implemented more efficiently and includes a direct restoration of the context by reloading the processor registers with the saved original context values, without forcing a second exception. The following three code examples implement step 222, and include an extra trap back to an exception handler:

```
void mirror_return(void)
{
    asm volatile(
        "   xchgl %%ebx, %%esp   \n"
        "   int 3                \n"
        : : "b" (mirror_probe_saved_esp) : "memory");
}
```

The preceding example causes a trap back into the exception handler, which restores the original context, as shown in the following code:

```
*regs = mirror_probe_saved_regs;
```

A return from the exception handler is provided by the following code.

```
iret;
```

After retrieving the function's entry point instruction, which was replaced in step 206, execution continues at the entry point of the probed function in step 224. Step 224 includes associating an argument of the probed function with the value provided by the calling instruction in step 207. During the function execution in step 224, a reference to the argument of the probed function accesses the associated value by employing the contents of the registers in the same way the mirror probe handler accessed the value in step 218. The value can be accessed by the probed function in the same way in part because the state of the stack and/or the one or more other registers was restored to the original context in step 222. For example, if a stack-based argument passing convention is employed, the probed function accesses values of its arguments by accessing contents of registers with the same stack pointer and the same offsets as those used by the mirror probe handler in step 218 to access the same values. In the sample code provided above illustrating a function to be probed, the execution continuing in step 224 includes performing the direct I/O operation that follows the function prototype. The process of accessing a value of an argument of a probed function ends at step 226.

The embodiment described above can be modified for use in a register-based architecture. In such a case, the contents of registers include the values of arguments and certain register numbers correspond to specific argument values. Since at step 216 execution jumps to the mirror probe handling routine while the state of the registers matches the original context saved in step 210, the mirror probe handling routine employs the register-to-argument correspondence when referencing its argument in step 218. This reference accesses the same value that was to be passed to the matching argument of the function being probed. A register-based architecture can also be employed with the alternate embodiments described below.

Although the present invention requires that the probe handling routine be compiled with the same calling and linkage conventions as the probed function, it does not require specific architectures and specific types of calling and linkage conventions. Further, the present invention applies not only to the breakpoint-based probe insertion approach used in the embodiment described above, but also to other kinds of probe schemes, such as dynamic code instrumentation and code patching techniques. As an example of code patching, an instruction at the entry of function 102 (see FIG. 1) is replaced with a jump (e.g., branch) instruction acting as the mirror probe, which when hit, causes execution to jump to a code patch placed in another area of code external to the function. The code patch includes (1) dynamically generated code (i.e., the mirror probe handler) that includes a reference that points to an argument of the function being probed; (2) the replaced instruction (or an equivalent sequence); and (3) a branch instruction to redirect execution back to the instruction that follows the entry point of the function. As this code patching technique jumps directly to the mirror probe handler, an exception (e.g., breakpoint) handler is not required.

Refinements of the aforementioned code patching technique can also be employed with the alternate embodiments described below. Further details regarding code patching techniques are provided by Ariel Tamches & Barton P. Miller, "Fine-Grained Dynamic Instrumentation of Commodity Operating System Kernels," *Proceedings of the 3rd Symposium on Operating Systems Design and Implementation*, pp. 117-130, New Orleans, La., February 1999; Luiz DeRose, Ted Hoover, Jr., & Jeffrey K. Hollingsworth "The Dynamic Probe Class Library—An Infrastructure for Developing Instrumentation for Performance Tools," *Proceedings of the 15th International Parallel and Distributed Processing Symposium (IPDPS* 2001), San Francisco, Calif., April 2001; and Bryan Buck & Jeffrey K. Hollingsworth, "An API for Runtime Code Patching," *International Journal of High Performance Computing Applications*, Vol. 14, No. 4, pp. 317-329, Sage Publications 2000, each of which is hereby incorporated herein by reference, in its entirety.

First Alternate Embodiment

Figure 3A:
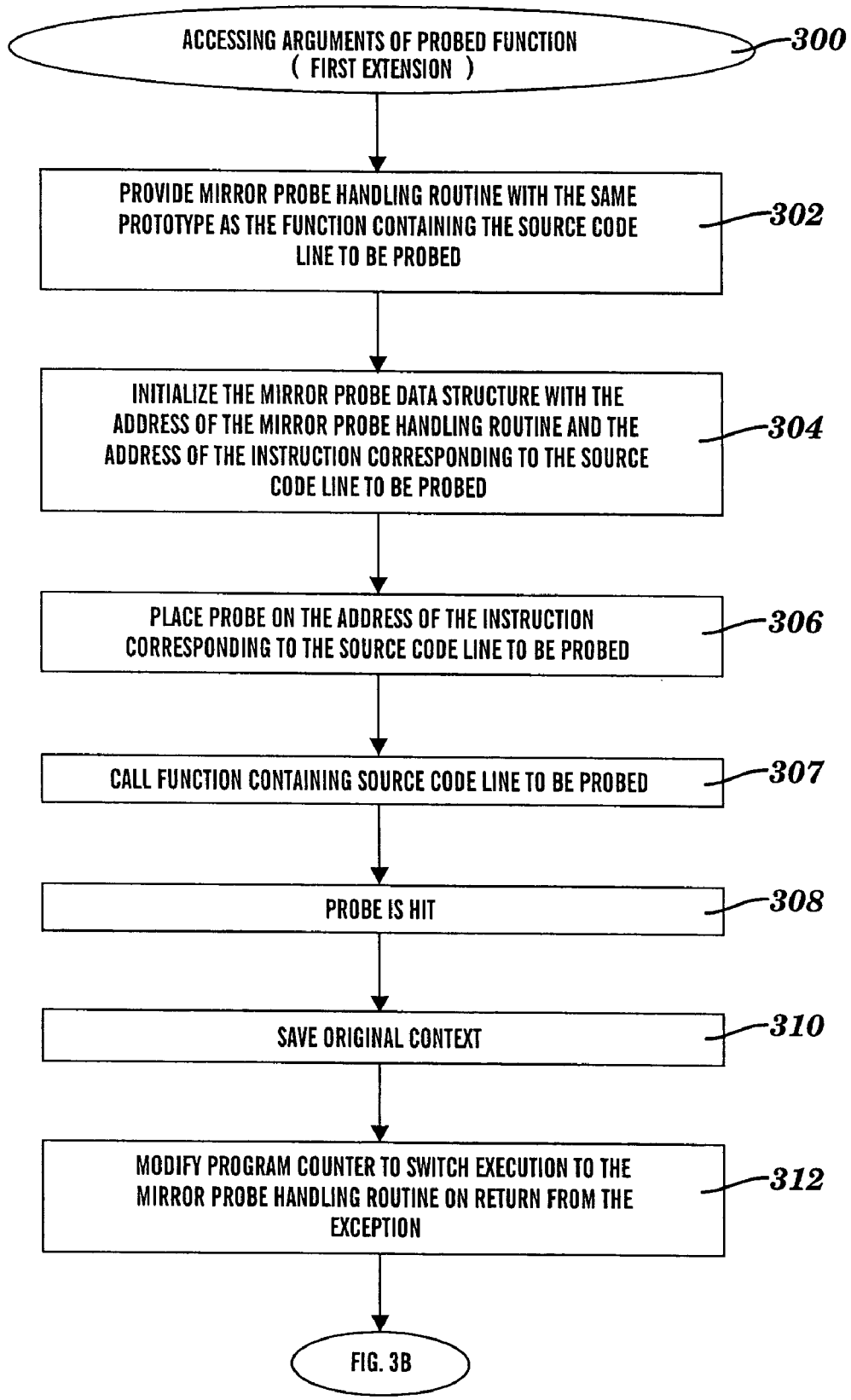
FIGS. 3A-3B illustrate a flow chart of logic that implements a first extension to the logic in FIGS. 2A-2B for employing a mirror probe handler to access arguments of a probed function, in accordance with embodiments of the present invention.
Figure 3B:
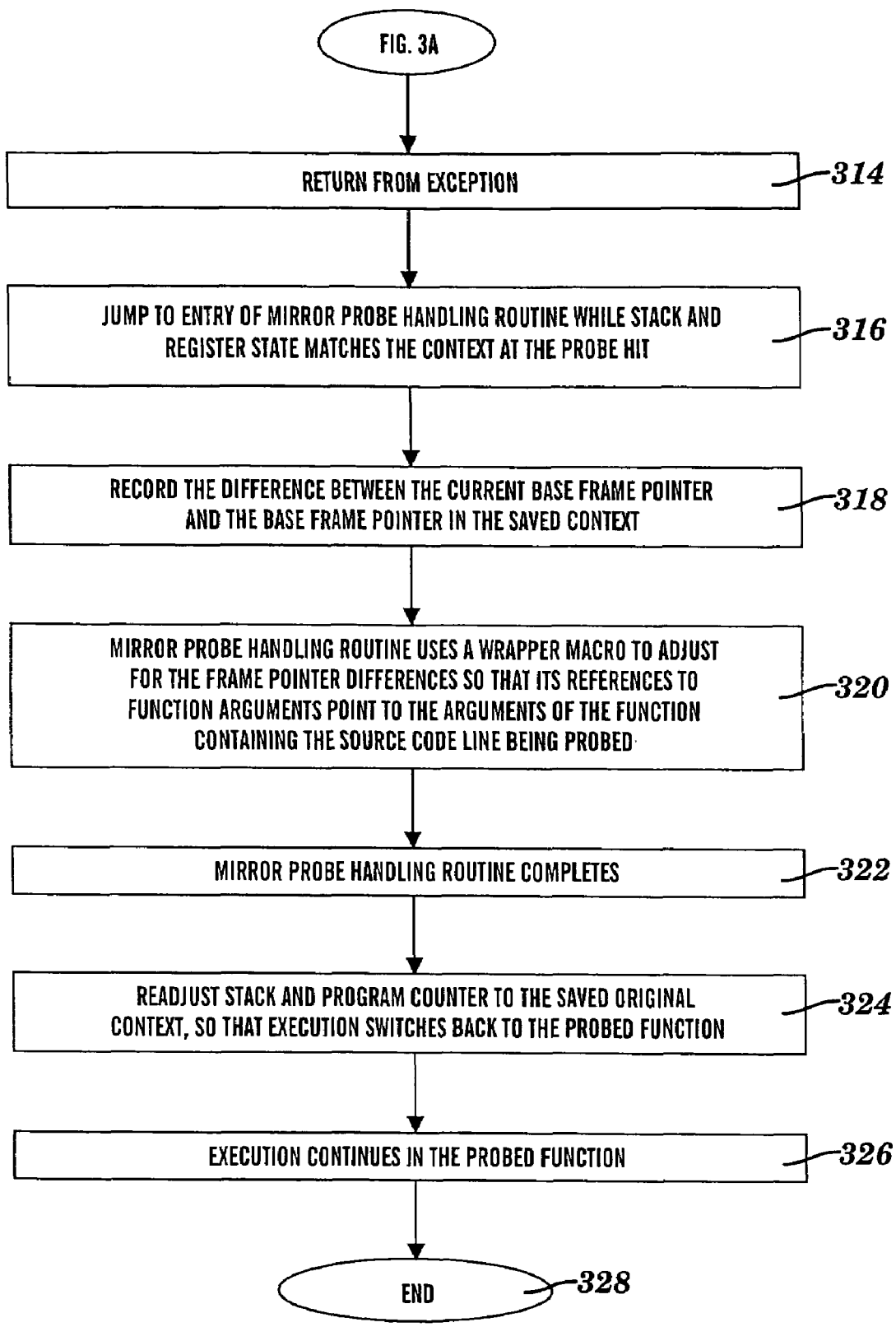

FIGS. 3A-3B illustrate a flow chart of logic that implements a first extension to the logic in FIGS. 2A-2B for employing a mirror probe handler to access arguments of a probed function, in accordance with embodiments of the present invention. The first extension (i.e., first alternate embodiment) addresses the case in which a mirror probe is placed at an address of an instruction corresponding to a source code line within a function to be probed, rather than being restricted to the address of the entry point of the function. In this first alternate embodiment, restrictions include (1) the code of the function to be probed is compiled with frame pointers enabled, and (2) the architecture on which the alternate embodiment is applied includes a stack-based argument passing convention, rather than a register-based argument passing convention. On certain architectures (e.g., Intel 32-bit architecture (IA-32), a.k.a. x86), compilation of the function to be probed generates code to be executed at the beginning of that function's execution, which sets up a frame pointer and uses the frame pointer as a reference to access arguments of the function. In one example, the function to be probed is compiled with a frame pointer-related compiler option turned on. The technique described above relative to FIGS. 2A-2B can be extended to a workable scheme under the aforementioned restrictions, if the difference between a saved base frame pointer and a current base frame pointer is recorded and a wrapper macro offsets the recorded difference to access arguments. A more detailed description of the first alternate embodiment is presented below.

The argument access process of the first alternate embodiment begins at step 300. In this embodiment, function 102 (see FIG. 1) is provided which includes a source code line to be probed (i.e., a mirror probe is to be placed at the address of the instruction corresponding to the source code line to be probed).

```
ssize_t do_sync_read(struct file *filp, char __user *buf, size_t len,
loff_t *ppos)
{
  struct kiocb kiocb;
  ssize_t ret;
  init_sync_kiocb(&kiocb, filp);
  kiocb.ki_pos = *ppos;
  ret = filp->f_op->aio_read(&kiocb, buf, len, kiocb.ki_pos);
  if (-EIOCBQUEUED == ret)
    ret = wait_on_sync_kiocb(&kiocb); /* <--- line to be probed */
  *ppos = kiocb.ki_pos;
  return ret;
}
```

In step 302, mirror probe handling routine 108 (see FIG. 1) is provided. The mirror probe handling routine is defined with the same prototype as the function 102 (see FIG. 1) that includes the source code line to be probed. The following code is an example of the mirror probe handling routine that accesses the values of the arguments of the do_sync_read function presented above:

```
ssize_t mirror_sync_read(struct file *filp, char __user *buf, size_t len,
loff_t *ppos)
{
  /* set foffset = current frame pointer – saved frame pointer */
  MIRROR_RECORD_FRAME(foffset);
  ...
  printk("do_sync_read: reading %d bytes\n",
    MIRROR_ARG(len, foffset));
  ...
  mirror_end( );
}
```

In step 304, a mirror probe data structure supplied to the kernel space in a module is initialized with a memory address of the mirror probe handling routine (e.g., address of the entry point of the mirror probe handling routine) and a memory address of the instruction corresponding to the source code line to be probed. The mirror probe handling routine is also supplied to the kernel space in the module.

In step 306, mirror probe 110 (see FIG. 1) is placed on the address of the instruction corresponding to the source code line to be probed. The particular probe insertion techniques discussed above relative to step 206 in FIG. 2A can also be used to implement step 306. In step 307, function 102 (see FIG. 1) is called from, for example, an instruction in the running operating system kernel. This call in step 307 provides one or more values, each of which is to be associated with an argument of the one or more arguments of function to be probed 102 (see FIG. 1). In response to the calling instruction being executed in step 307, the return address of the function whose source code line is to be probed is saved on the stack, the stack pointer is updated accordingly, and the program counter is loaded with the address of the function's entry point. The function that includes the source code line to be probed (function 102 in FIG. 1) is executed in part, and the base frame pointer associated with the function is generated by that partial execution of the function. After beginning execution of function 102 (see FIG. 1), the mirror probe placed at the address described above (see step 306) is hit at step 308. Upon hitting the mirror probe, probing actions begin with an execution of the mirror probe, which temporarily replaces part of the execution of the function being probed, and is followed by, for example, an execution of exception handler 112 (see FIG. 1). In step 310, the original context, which includes the program counter, stack, the base frame pointer associated with the function, and the one or more other registers that are used to access arguments, is saved by, for instance, the exception handler. The program counter is modified by, for example, the exception handler in step 312 to switch execution to the mirror probe handling routine (e.g., upon returning from the exception handler). For example, the program counter is modified to include an address of the entry of the mirror probe handling routine.

The argument access process of the first alternate embodiment continues in step 314 of FIG. 3B as a return from the exception handler occurs. Because the program counter was modified in step 312, execution jumps in step 316 to the entry of the mirror probe handling routine, while the state of the stack and the one or more other registers matches the context of the processor at the time the mirror probe was hit.

The mirror probe handling routine begins execution, which together with the previous execution of the mirror probe, temporarily replaces part of the execution of function 102 (see FIG. 1). During execution of the mirror probe handling routine, a current base frame pointer associated with the mirror probe handling routine is determined. This current base frame pointer is different from the base frame pointer saved in the original context in step 310. The following example illustrates how a base frame pointer saved in the original context changes to the current base frame pointer associated with a routine being executed. This example includes the first bytes of a disassembly of object code of a routine compiled with frame pointers enabled in an x86 architecture:

```
00000013 <mirror_func>:
  13: 55        push   %ebp
  14: 89 e5     mov    %esp,%ebp
```

The example presented above indicates a sequence of instructions generated by the compiler at the entry point of the routine, which are executed before instructions corresponding to source code of the routine. The first instruction in this example pushes the original context's saved base frame pointer (i.e., % ebp, or the ebp register) on stack, which implicitly changes the stack pointer (i.e., % esp, or the esp register). The next instruction loads the value of % esp into % ebp, which provides an updated current base frame pointer. At the time of execution of the first source code line of the routine, the current base frame pointer (i.e., the ebp register) is different from the saved base frame pointer in the original context.

In step 318, the difference between the current base frame pointer and the base frame pointer in the saved context is recorded. The sample code presented relative to step 302 illustrates the recording of the difference of step 318. Using a wrapper macro in step 320, the mirror probe handling routine adjusts for the frame pointer differences so that references of mirror probe handler arguments point to the arguments of the function containing the source code line being probed. That is, a reference of an argument by mirror probe handler 108 (see FIG. 1) accesses a value associated with an argument of function 102 (see FIG. 1). The referencing in step 320 allows the mirror probe handling routine to seamlessly access the value of an argument of the function being probed, as if the referencing were being performed within the scope of the function being probed. An example of calling a wrapper macro is included in the code example provided above relative to step 302. The following example illustrates a wrapper macro to be called in step 320:

```
#define MIRROR_ARG(x, foffset)    (*(&x + foffset))
```

In step 322, execution of the mirror probe handling routine ends and the probing actions are completed. To continue execution in the function that includes the probed source line, the stack, program counter, and the one or more other registers are restored in step 324 to their states as they were saved in the original context in step 310. The particular stack/register restoration techniques discussed above relative to step 222 (see FIG. 2B) also apply to step 324. Execution continues seamlessly in the probed function in step 326 and the process of the first alternate embodiment ends at step 328. During the execution in step 326, a reference to an argument of the probed function accesses the same value accessed by referencing a corresponding argument of the mirror probe handling routine in step 320.

Second Alternate Embodiment

Figure 4A:
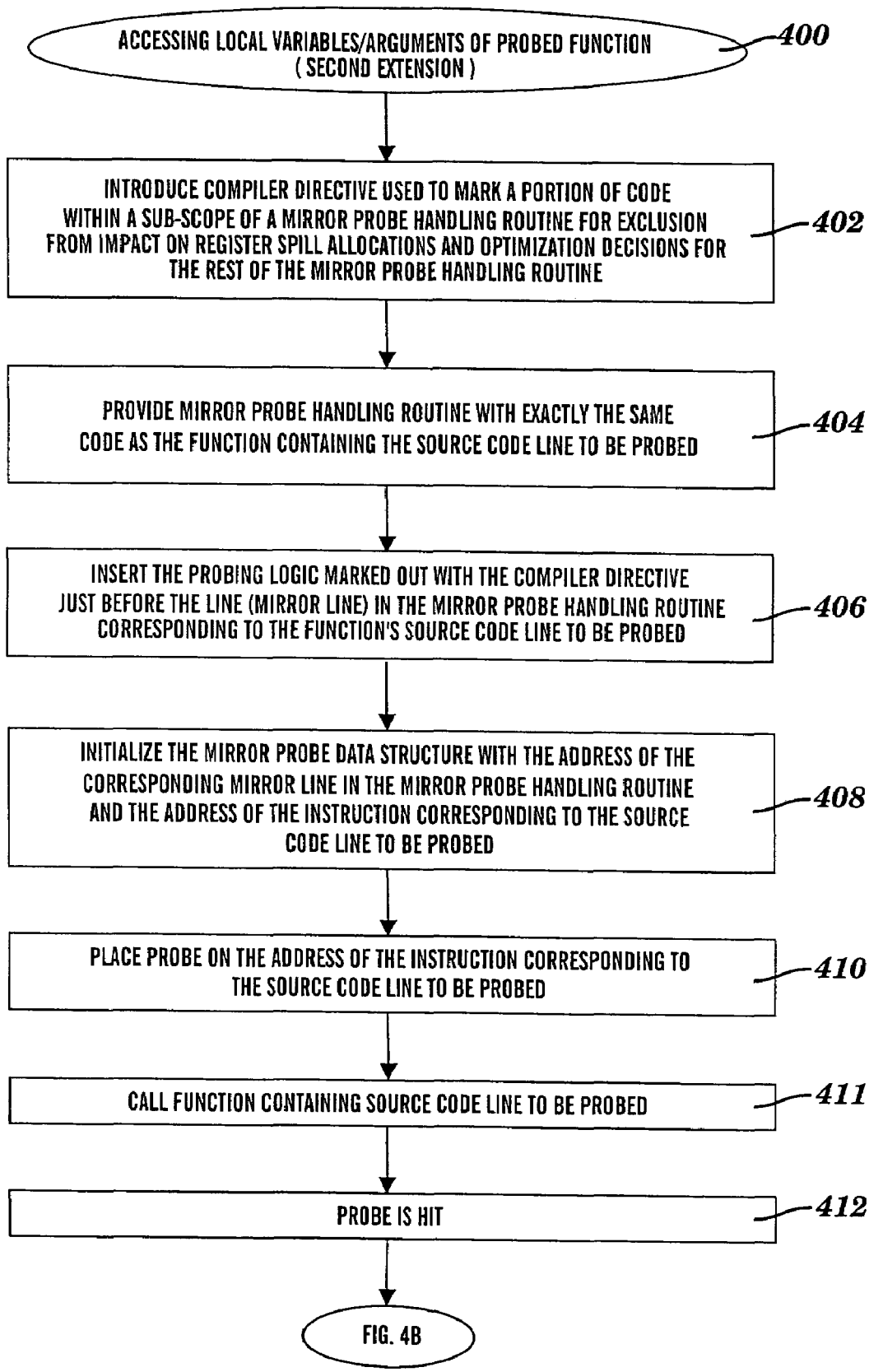
FIGS. 4A-4B illustrate a flow chart of logic that implements a second extension to the logic in FIGS. 2A-2B for employing a mirror probe handler to access arguments and/or local variables of a probed function, in accordance with embodiments of the present invention.
Figure 4B:
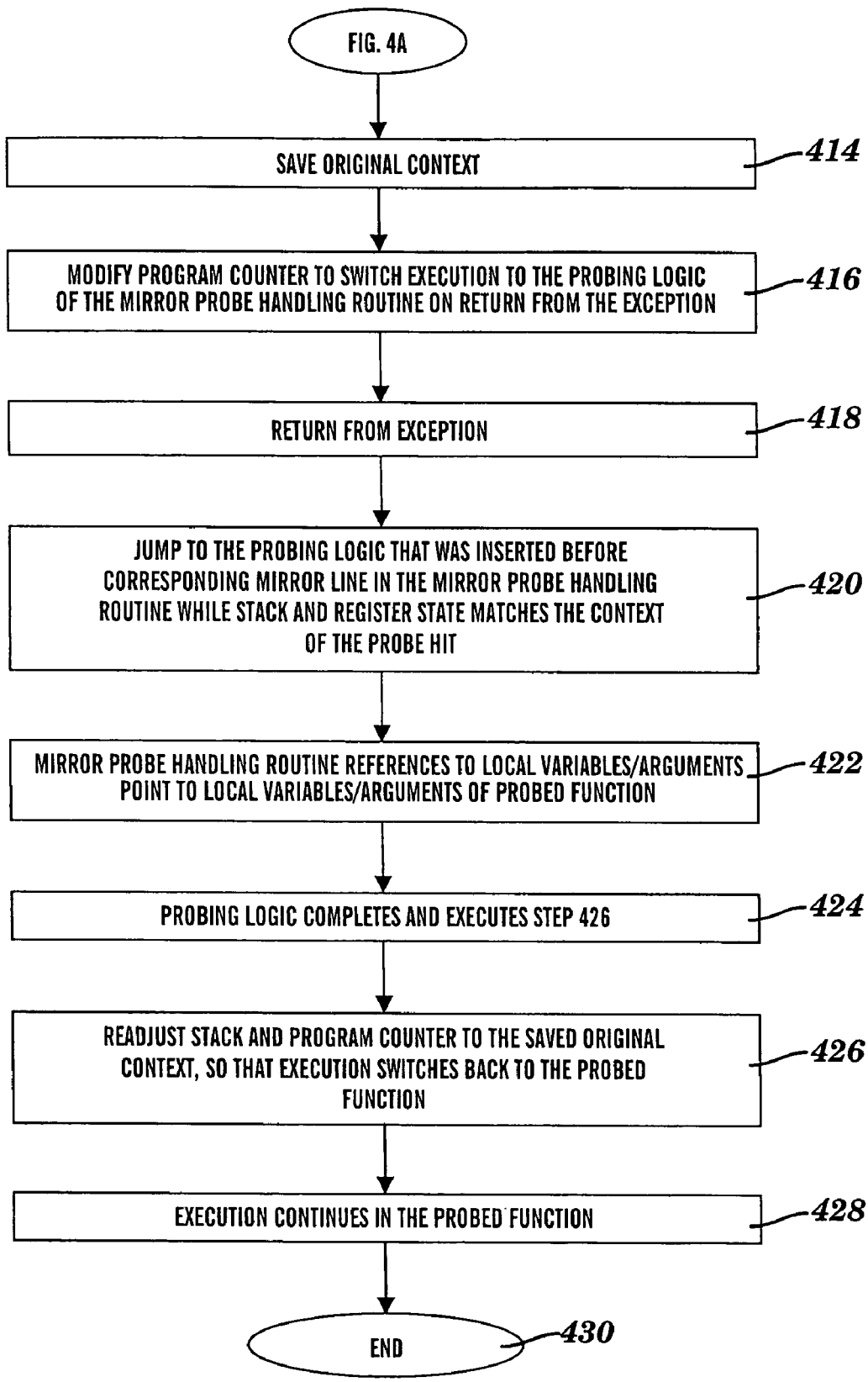

FIGS. 4A-4B illustrate a flow chart of logic that implements a second extension to the logic in FIGS. 2A-2B for employing a mirror probe handler to access local variables and/or arguments of a function, in accordance with embodiments of the present invention. The second extension (i.e., second alternate embodiment) enables access to not only arguments, but also local variables of a function that includes a source code line to be probed. A source code line to be probed is a source code line of function 102 (see FIG. 1) on whose corresponding instruction address a mirror probe is to be placed. This second alternate embodiment is limited in that it requires access to the full source code of the function whose source code line is to be probed, rather than requiring knowledge of only the prototype of the function.

The local variable/argument access process of the second alternate embodiment begins at step 400. An example of function 102 (see FIG. 1) that includes a source code line to be probed by the second alternate embodiment is illustrated by the following code:

```
ssize_t do_sync_read(struct file *filp, char __user *buf, size_t len,
loff_t *ppos)
{
  struct kiocb kiocb;
  ssize_t ret;
  init_sync_kiocb(&kiocb, filp);
  kiocb.ki_pos = *ppos;
  ret = filp->f_op->aio_read(&kiocb, buf, len, kiocb.ki_pos);
  /* <-- line to be probed */
  if (-EIOCBQUEUED == ret)
      ret = wait_on_sync_kiocb(&kiocb);
```

-continued

```
  *ppos = kiocb.ki_pos;
  return ret;
}
```

In step 402, a compiler directive is introduced to mark or specify a portion of code (hereinafter, the "specified portion") within a sub-scope of mirror probe handling routine 108 (see FIG. 1) that includes a source code line to be probed, the specified portion being excluded from the impact of register spill allocations and compiler optimization decisions for the rest of the mirror probe handling routine (i.e., for the portion of the mirror probe handler not included in the specified portion, hereinafter referred to as the "non-specified portion"). A compiler directive is a statement embedded in source code that controls what the compiler does, rather than what the compiled program does. The introduction of this compiler directive ensures that the state of the stack and the one or more other registers that can be used to access arguments are the same in mirror probe handling routine 108 (see FIG. 1) as in function to be probed 102 (see FIG. 1), at least up to the point at which the probing logic starts in the mirror probe handling routine. The probing logic is discussed below relative to step 406.

In step 404, mirror probe handling routine 108 (see FIG. 1) is provided with exactly the same code as function 102 (see FIG. 1), which includes the source code line to be probed (i.e., the mirror probe handling routine "fully mirrors" the function containing the source code line to be probed). In step 406, probing logic marked out with the compiler directive introduced in step 402 is inserted immediately before a code line (hereinafter, the mirror line) in mirror probe handling routine 108 (see FIG. 1) which corresponds to the source code line to be probed of function 102 (see FIG. 1). In this case, "corresponds" means that the mirror line matches the source code line to be probed in content and in positioning relative to other source code lines prior to the insertion of the probing logic. Probing logic includes one or more code lines that are used to reference a local variable (or argument) of mirror probe handling routine 108 (see FIG. 1) to ultimately access a value of a local variable (or argument) of function 102. This value is accessed, for example, by accessing the contents of the stack and/or the one or more other registers via the referencing provided by the probing logic during the execution of the mirror probe handling routine.

The probing logic's insertion "immediately before" the mirror line refers to the probing logic being placed after the instructions corresponding to the source code lines prior to the mirror line and before the instruction(s) corresponding to the mirror line. That is, the probing logic is immediately before the mirror line in the execution sequence if the entire mirror probe handling routine were to execute. Of course, the entire mirror probe handling routine does not actually execute, as will be apparent from the steps described below relative to FIGS. 4A-4B. The placement of the probing logic allows it to initiate execution just before the line being probed in function 102 (see FIG. 1) while the state of the stack and the one or more other registers is as it would have been at the execution of the line being probed. The following code is an example of mirror probe handling routine 108 (see FIG. 1) that includes (1) code that matches the code of function 102 (see FIG. 1); and (2) probing logic inserted in the specified portion of code, as indicated by the compiler directive introduced in step 402. The mirror line is also indicated in the following code example.

```
ssize_t mirror_sync_read(struct file *filp, char __user *buf, size_t len,
loff_t *ppos)
{
    struct kiocb kiocb;
    ssize_t ret;
    init_sync_kiocb(&kiocb, filp);
    kiocb.ki_pos = *ppos;
    <"contain impact" compiler directive start > {
        /*... probing logic ... */
        printk("do_sync_read: len %d ret %d\n", len, ret);
    } <"contain impact" compiler directive end>
    ret = filp->f_op->aio_read(&kiocb, buf, len, kiocb.ki_pos);
    /* <-- mirror line */
    if (-EIOCBQUEUED == ret)
        ret = wait_on_sync_kiocb(&kiocb);
    *ppos = kiocb.ki_pos;
    return ret;
}
```

In step 408, a data structure associated with mirror probe 110 (see FIG. 1), which is supplied to the kernel space in a module, is initialized with a memory address of the corresponding mirror line in mirror probe handling routine (see FIG. 1) and a memory address of the instruction corresponding to the source code line to be probed of function 102 (see FIG. 1). The mirror probe handling routine is also supplied to the kernel space in the module.

In step 410, mirror probe 110 (see FIG. 1) is placed on the address of the instruction corresponding to the source code line to be probed. The particular probe insertion techniques discussed above relative to step 206 (see FIG. 2A) can also be used to implement step 410. Step 411 calls function 102 (see FIG. 1), which includes the source code line to be probed. This function call in step 411 provides one or more values, each of which is to be associated with an argument of the one or more arguments of function 102 (see FIG. 1). In response to the calling instruction being executed in step 411, the return address of function 102 of FIG. 1 is saved on the stack, the stack pointer is updated accordingly, and the program counter is loaded with the address of the function's entry point. Function to be probed 102 (see FIG. 1) begins execution, and in one embodiment, a value is associated with a local variable of the function to be probed. For example, the value is assigned to the local variable by an instruction executed in the function prior to the mirror probe being hit. Upon hitting the mirror probe in step 412, probing actions begin with an execution of the mirror probe instruction(s), which temporarily replace part of the execution of the function being probed, and is followed by, for example, an execution of exception handler 112 (see FIG. 1).

The process of the second alternate embodiment continues in step 414 of FIG. 4B, in which the original context, which includes the stack, program counter and the one or more other registers used to access arguments and/or local variables is saved at the time of the mirror probe hit by, for instance, the exception handler. In step 416, the program counter is modified, so that execution will be switched (e.g., upon returning from the exception handler) to the start of the probing logic inserted into the mirror probe handling routine in step 406. For example, the program counter is modified to include an address of the first instruction of the probing logic. In step 418, a return from the exception handler occurs. Because the program counter was modified in step 416, execution jumps in step 420 to the probing logic that was inserted before the corresponding mirror line in the mirror probe handling routine, while the state of the stack and the one or more registers matches the original context saved in step 414.

An execution of the probing logic begins, which together with the previous execution of the mirror probe, temporarily replaces part of the execution of the function being probed. During execution of the probing logic of the mirror probe handling routine, a reference in step 422 to a local variable or an argument of mirror probe handling routine 108 (see FIG. 1) accesses a value associated with a corresponding local variable or argument of function 102 (see FIG. 1). The referencing in step 422 accesses the value by automatically accessing the contents of the stack and/or the one or more other registers as they were saved in step 414. The register access in step 422 is automatic in the sense that the access is responsive to a reference of a local variable or argument of the mirror probe handling routine without depending upon code analysis, interpretation of debug information, or architecture-specific and ABI-specific knowledge of argument layout and calling conventions. The automatic access in step 422 is a result of the code of function 102 of FIG. 1 being fully mirrored in the mirror probe handling routine and the specified portion of code being excluded from the effects described above relative to step 402. By employing the stack/register state of the original context, the value accessed in step 422 is the same value that would have been associated with a local variable or argument of function 102 (see FIG. 1) had the probe not been placed in step 410, and that will be associated therewith in step 428 described below. The referencing in step 422 allows the mirror probe handling routine to seamlessly access the value of a local variable/argument of the function being probed, as if the referencing were being performed within the scope of the function being probed.

In step 424, execution of the probing logic ends and step 426 restores the stack, program counter and the one or more other registers to their states as saved in the original context (see step 414), so that execution can switch back seamlessly to function 102 (see FIG. 1). The particular stack/register restoration techniques discussed above relative to step 222 (see FIG. 2B) also apply to step 426. In step 428, execution continues in function 102 (see FIG. 1) at the address of the instruction corresponding to the probed source code line after, for instance, the instruction is re-associated with its original address (i.e., the address with which the instruction was associated prior to the placement of the mirror probe in step 410). During the execution in step 428, a reference to a local variable or argument of the probed function accesses the value associated with the local variable or argument by employing the stack and/or the one or more other registers in the same way the mirror probe handler accessed the local variable or argument in step 422. The process of the second alternate embodiment ends at step 430.

Figure 5:
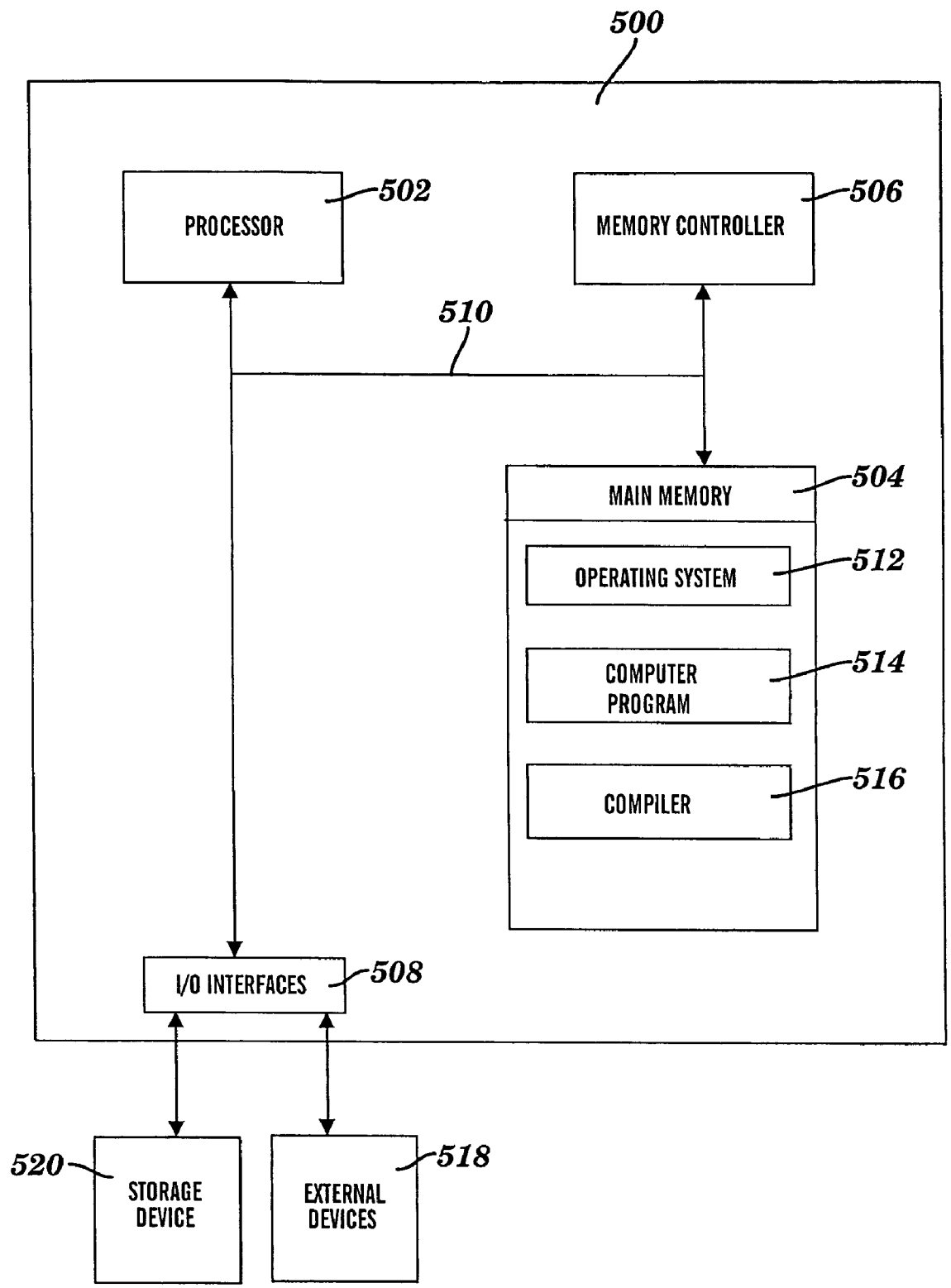
FIG. 5 depicts a computer system for implementing the employment of a mirror probe handler to access arguments of a probed function for the system of FIG. 1, in accordance with embodiments of the present invention.

FIG. 5 depicts a computer system for implementing the employment of a mirror probe handler to access arguments of a probed function for the system of FIG. 1 and the logic of FIGS. 2A-2B, 3A-3B and/or 4A-4B, in accordance with embodiments of the present invention. Computer system 500 suitably comprises a processor 502, a main memory 504, a memory controller 506, and at least one input/output (I/O) interface 508, all of which are interconnected via a system bus 510. Main memory 504 includes an operating system 512, a computer program 514, and a compiler 516. Main memory 504 includes an algorithm including the argument access logic depicted in the flowcharts of FIGS. 2A-2B, 3A-3B, and/or 4A-4B. In one embodiment, computer program 514 is the running program which includes function to be probed 102 (see FIG. 1), and into which mirror probe 110 (see FIG. 1) is inserted in step 206 (see FIG. 2A). As an alternative to its position in FIG. 5, computer program 514 may be included within operating system 512. As one example, processor 502 is an Intel processor based on the x86 architecture, and operating system 512 is the Linux operating system.

Processor 502 performs computation and control functions of computer system 500, and comprises a suitable central processing unit. Processor 502 may comprise a single integrated circuit, such as a microprocessor, or may comprise any suitable number of integrated circuit devices and/or circuit boards working in cooperation to accomplish the functions of a processor. Processor 502 suitably executes one or more computer programs, including computer program 514, within main memory 504. In one embodiment, processor 502 executes the algorithm implementing the logic depicted in the flow charts of FIGS. 2A-2B, 3A-3B and/or 4A-4B.

I/O interfaces 508 may comprise any system for exchanging information from external sources such as external devices 518. External devices 518 may comprise conventional external devices including a display monitor, keyboard, mouse, printer, plotter, facsimile, etc. Computer system 500 can be connected to one or more other computers via a communication interface using an appropriate communication channel (not shown) such as a modem communications path, a computer network, or the like. The computer network (not shown) may include a local area network (LAN), a wide area network (WAN), Intranet, and/or the Internet.

I/O interfaces 508 also allow computer system 500 to store and retrieve information (e.g., program instructions or data) from an auxiliary storage device 520, such as a non-volatile storage device, which can be, for example, a CD-ROM drive which receives a CD-ROM disk (not shown). Computer system 500 can store and retrieve information from other auxiliary storage devices (not shown), which can include a direct access storage device (DASD) (e.g., hard disk or floppy diskette), a magneto-optical disk drive, a tape drive, or a wireless communication device.

Memory controller 506, through use of a processor (not shown) separate from processor 502, is responsible for moving requested information from main memory 504 and/or through I/O interfaces 508 to processor 502. While for the purposes of explanation, memory controller 506 is shown as a separate entity, those skilled in the art understand that, in practice, portions of the function provided by memory controller 506 may actually reside in the circuitry associated with processor 502, main memory 504, and/or I/O interfaces 508.

It should be understood that main memory 504 will not necessarily contain all parts of all mechanisms shown. For example, portions of computer program 514 and operating system 512 may be loaded into an instruction cache (not shown) for processor 502 to execute, while other files may well be stored on magnetic or optical disk storage devices, such as storage device 520. In addition, although computer program 514 is shown to reside in the same memory location as operating system 512, it is to be understood that main memory 504 may consist of disparate memory locations.

A terminal interface of I/O interfaces 508 allows system administrators and computer programmers to communicate with computer system 500. Although computer system 500 depicted in FIG. 5 contains only a single main processor 502 and a single system bus 510, it should be understood that the present invention applies equally to computer systems having multiple processors and multiple system buses. Similarly, although system bus 510 is a typical hardwired, multidrop bus, any connection means that supports bi-directional communication in a computer-related environment could be used.

A computer system 500 in accordance with the present invention is, for example, a personal computer. However, those skilled in the art will appreciate that the methods and apparatus of the present invention apply equally to any computer system, regardless of whether the computer system is a complicated multi-user computing apparatus or a single user device such as a workstation.

Note that various modifications, additions, or deletions may be made to computer system 500 illustrated in FIG. 5 within the scope of the present invention such as the addition of cache memory or other peripheral devices. FIG. 5 is presented to simply illustrate some of the salient features of computer system 500.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 500, wherein the code in combination with computer system 500 is capable of performing a process of accessing an argument of a probed function.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of accessing, from a mirror probe handler, a value to be associated with an argument of a function in a computing environment, said method comprising:

initiating an execution of a function by a processor, said function defined with a first prototype associated with a first set of one or more arguments, and said initiating providing at least part of a state of a plurality of registers of said processor, and a value to be associated with an argument of said first set, wherein at least part of said execution of said function is to be temporarily replaced by an execution of the mirror probe handler, the mirror probe handler defined with a second prototype associated with a second set of one or more arguments, the mirror probe handler associated with a mirror probe placed in a running program at the address of the entry point of the function to be probed, wherein said first prototype and said second prototype are identical, and wherein said state of said plurality of registers facilitates an access to said value;

executing said mirror probe, responsive to said initiating said execution, said mirror probe being at least one instruction for temporarily replacing said at least part of said execution of said function;

saving, responsive to said executing said mirror probe, said state of said plurality of registers;

modifying a program counter to include an address associated with said mirror probe handler in response to returning from an execution of an exception handler, wherein said exception handler is executed in response to said executing said mirror probe, and wherein said program counter is a register of said plurality of registers;

returning from said exception handler; and initiating execution of said mirror probe handler, said initiating responsive to said modifying said program counter and said returning, wherein, upon said initiating said execution, a state of said plurality of registers matches said state saved via said saving;

referencing, during said executing said mirror probe handler, said argument of said second set to provide said access to said value, said referencing automatically employing at least one register of said plurality of registers to access said value, wherein said first prototype and said second prototype being identical facilitates said referencing automatically employing said at least one register to access said value; and after said referencing accesses said value, restoring said state saved via said saving, said restoring facilitating said at least part of said execution of said function, wherein said value is associated with said argument of said first set during said at least part of said execution.

2. The method of claim 1, further comprising:
initializing a data structure associated with said mirror probe to include a first address associated with said mirror probe handler and a second address associated with an entry of said function;

and placing said mirror probe in executable code, wherein a part of said executable code includes said function, and wherein said placing associates said mirror probe with said second address.

3. The method of claim 1, further comprising, if a stack-based calling convention is associated with said processor, and a frame pointer is associated with said function and said mirror probe handler:

initializing a data structure associated with said mirror probe to include a first address associated with said mirror probe handler and a second address associated with a line of code of said function; and placing said mirror probe in executable code of said function, wherein said placing associates said mirror probe with said second address, wherein said frame pointer is associated with a register of said plurality of registers, and wherein said register is to be employed to access said value.

4. The method of claim 3, further comprising:
determining a first value of said frame pointer during said execution of said function;

determining a second value of said frame pointer during said executing said mirror probe handler;

recording a difference between said first value and said second value; and adjusting for said difference to identify said at least one register to be employed by said referencing to provide said access to said value.

5. The method of claim 1, further comprising:
referencing, during said executing said mirror probe handler, a first local variable of said mirror probe handler to provide an access to a first value associated with said first local variable via said executing said mirror probe handler, said referencing said first local variable automatically employing one or more registers of said plurality of registers to access said first value, wherein said first value is to be associated with a second local variable of said function during said at least part of said execution of said function, wherein said state of said plurality of registers facilitates said access to said first value, wherein said mirror probe handler includes a copy of said function, wherein said copy of said function provides said first local variable as a copy of said second local variable, and a first line of code of said mirror probe handler as a copy of a second line of code of said function, wherein said mirror probe handler includes probing logic not included in said copy of said function, said probing logic being included in a region of code of said mirror probe handler inserted before said first line of code, wherein said region of code is excluded from one or more effects of one or more register spill allocations and one or more compiler optimization decisions during a compilation associated with said mirror probe handler, and wherein said copy of said function being included in said mirror probe handler and said region of code being excluded from said one or more effects facilitate said referencing said first local variable automatically employing said one or more registers to access said first value.

6. The method of claim 5, further comprising:
initializing a data structure associated with said mirror probe to include a first address associated with said first line of code of said mirror probe handler and a second address associated with said second line of code of said function; and placing said mirror probe in executable code of said function, wherein said placing associates said probe with said second address.

7. The method of claim 6, further comprising:
modifying a program counter to include an address associated with said probing logic in response to returning from an execution of an exception handler, wherein said exception handler is executed in response to said executing said mirror probe, and wherein said program counter is a register of said plurality of registers;

returning from said exception handler; and executing said probing logic responsive to said modifying said program counter and said returning, wherein, upon initiating said executing said probing logic, a state of said plurality of registers matches said state saved via said saving, wherein said referencing said first local variable accesses said first value during said executing said probing logic.

8. A system, comprising a processor, memory coupled to said processor, said memory containing processor-executable instructions for accessing, from a mirror probe handler, a value to be associated with an argument of a function in a computing environment, said instructions comprising:

instructions for initiating an execution of a function by a processor, said function defined with a first prototype associated with a first set of one or more arguments, and said initiating providing at least part of a state of a plurality of registers of said processor, and a value to be associated with an argument of said first set, wherein at least part of said execution of said function is to be temporarily replaced by an execution of a mirror probe handler, the mirror probe handler defined with a second prototype associated with a second set of one or more arguments, the mirror probe handler associated with a mirror probe placed in a running program at the address of the entry point of the function to be probed, wherein said first prototype and said second prototype are identical, and wherein said state of said plurality of registers facilitates an access to said value;

instructions for executing said mirror probe, responsive to said initiating said execution, said probe being at least one instruction for temporarily replacing said at least part of said execution of said function;

instructions for saving, responsive to said executing said probe, said state of said plurality of registers;

instructions for modifying a program counter to include an address associated with said mirror probe handler in response to returning from an execution of an exception handler, wherein said exception handler is executed in response to said executing said mirror probe, and wherein said program counter is a register of said plurality of registers;

instructions for return from said exception handler; and instructions for initiating execution of said mirror probe handler, said initiating responsive to said modifying said program counter and said returning, wherein, upon said initiating said execution, a state of said plurality of registers matches said state saved via said saving;

instructions for referencing, during said executing said mirror probe handler, said argument of said second set to provide said access to said value, said referencing automatically employing at least one register of said plurality of registers to access said value, wherein said first prototype and said second prototype being identical facilitates said referencing automatically employing said at least one register to access said value; and instructions for restoring, after said referencing accesses said value, said state saved via said saving, said restoring facilitating said at least part of said execution of said function, wherein said value is associated with said argument of said first set during said at least part of said execution.

9. The system of claim 8, further comprising:

instructions for initializing a data structure associated with said mirror probe to include a first address associated with said mirror probe handler and a second address associated with an entry of said function; and instructions for placing said probe in executable code, wherein a part of said executable code includes said function, and wherein said placing associates said mirror probe with said second address.

10. The system of claim 8, further comprising, if a stack-based calling convention is associated with said processor, and a frame pointer is associated with said function and said mirror probe handler:

instructions for initializing a data structure associated with said mirror probe to include a first address associated with said mirror probe handler and a second address associated with a line of code of said function; and instructions for placing said mirror probe in executable code of said function, wherein said placing associates said mirror probe with said second address, wherein said frame pointer is associated with a register of said plurality of registers, and wherein said register is to be employed to access said value.

11. The system of claim 10, further comprising:

instructions for determining a first value of said frame pointer during said execution of said function;

instructions for determining a second value of said frame pointer during said executing said mirror probe handler;

instructions for recording a difference between said first value and said second value;

and instructions for adjusting for said difference to identify said at least one register to be employed by said referencing to provide said access to said value.

12. The system of claim 8, further comprising:

instructions for referencing, during said executing said mirror probe handler, a first local variable of said mirror probe handler to provide an access to a first value associated with said first local variable via said executing said mirror probe handler, said referencing said first local variable automatically employing one or more registers of said plurality of registers to access said first value, wherein said first value is to be associated with a second local variable of said function during said at least part of said execution of said function, wherein said state of said plurality of registers facilitates said access to said first value, wherein said mirror probe handler includes a copy of said function, wherein said copy of said function provides said first local variable as a copy of said second local variable, and a first line of code of said mirror probe handler as a copy of a second line of code of said function, wherein said mirror probe handler includes probing logic not included in said copy of said function, said probing logic being included in a region of code of said mirror probe handler inserted before said first line of code, wherein said region of code is excluded from one or more effects of one or more register spill allocations and one or more compiler optimization decisions during a compilation associated with said mirror probe handler, and wherein said copy of said function being included in said mirror probe handler and said region of code being excluded from said one or more effects facilitate said referencing said first local variable automatically employing said one or more registers to access said first value.

13. The system of claim 12, further comprising:

instructions for initializing a data structure associated with said mirror probe to include a first address associated with said first line of code of said mirror probe handler and a second address associated with said second line of code of said function; and instructions for placing said probe in executable code of said function, wherein said placing associates said mirror probe with said second address.

14. The system of claim 8, further comprising:

instructions for modifying a program counter to include an address associated with said probing logic in response to returning from an execution of an exception handler, wherein said exception handler is executed in response to said executing said mirror probe, and wherein said program counter is a register of said plurality of registers;

instructions for returning from said exception handler; and
instructions for executing said probing logic responsive to said modifying said program counter and said returning, wherein, upon initiating said executing said probing logic, a state of said plurality of registers matches said state saved via said saving,
wherein said referencing said first local variable accesses said first value during said executing said probing logic.

15. At least one program storage device readable by a machine, tangibly embodying at least one program of instructions executable by the machine to perform a method of accessing, from a probe handler, a value to be associated with an argument of a function in a computing environment, said method comprising:

initiating an execution of a function by a processor, said function defined with a first prototype associated with a first set of one or more arguments, and said initiating providing at least part of a state of a plurality of registers of said processor, and a value to be associated with an argument of said first set, wherein at least part of said execution of said function is to be temporarily replaced by an execution of a mirror probe handler, the mirror probe handler defined with a second prototype associated with a second set of one or more arguments, the mirror probe handler associated with a mirror probe placed in a running program at the address of the entry point of the function to be probed, wherein said first prototype and said second prototype are identical, and wherein said state of said plurality of registers facilitates an access to said value;

executing said mirror probe, responsive to said initiating said execution, said mirror probe being at least one instruction for temporarily replacing said at least part of said execution of said function;

saving, responsive to said executing said mirror probe, said state of said plurality of registers;

modifying a program counter to include an address associated with said mirror probe handler in response to returning from an execution of an exception handler, wherein said exception handler is executed in response to said executing said mirror probe, and wherein said program counter is a register of said plurality of registers;

returning from said exception handler; and initiating execution of said mirror probe handler, said initiating responsive to said modifying said program counter and said returning, wherein, upon said initiating said execution, a state of said plurality of registers matches said state saved via said saving;

referencing, during said executing said mirror probe handler, said argument of said second set to provide said access to said value, said referencing automatically employing at least one register of said plurality of registers to access said value, wherein said first prototype and said second prototype being identical facilitates said referencing automatically employing said at least one register to access said value; and after said referencing accesses said value, restoring said state saved via said saving, said restoring facilitating said at least part of said execution of said function, wherein said value is associated with said argument of said first set during said at least part of said execution.

16. The at least one program storage device of claim 15, said method further comprising:

initializing a data structure associated with said mirror probe to include a first address associated with said mirror probe handler and a second address associated with an entry of said function;

and placing said mirror probe in executable code, wherein a part of said executable code includes said function, and wherein said placing associates said mirror probe with said second address.

17. The at least one program storage device of claim 15, said method further comprising, if a stack-based calling convention is associated with said processor, and a frame pointer is associated with said function and said mirror probe handler:

initializing a data structure associated with said mirror probe to include a first address associated with said mirror probe handler and a second address associated with a line of code of said function; and placing said mirror probe in executable code of said function, wherein said placing associates said mirror probe with said second address, wherein said frame pointer is associated with a register of said plurality of registers, and wherein said register is to be employed to access said value.

18. The at least one program storage device of claim 17, said method further comprising:

determining a first value of said frame pointer during said execution of said function;

determining a second value of said frame pointer during said executing said mirror probe handler;

recording a difference between said first value and said second value; and adjusting for said difference to identify said at least one register to be employed by said referencing to provide said access to said value.

19. The at least one program storage device of claim 15, said method further comprising:

referencing, during said executing said mirror probe handler, a first local variable of said mirror probe handler to provide an access to a first value associated with said first local variable via said executing said mirror probe handler, said referencing said first local variable automatically employing one or more registers of said plurality of registers to access said first value, wherein said first value is to be associated with a second local variable of said function during said at least part of said execution of said function, wherein said state of said plurality of registers facilitates said access to said first value, wherein said mirror probe handler includes a copy of said function, wherein said copy of said function provides said first local variable as a copy of said second local variable, and a first line of code of said mirror probe handler as a copy of a second line of code of said function, wherein said mirror probe handler includes probing logic not included in said copy of said function, said probing logic being included in a region of code of said mirror probe handler inserted before said first line of code, wherein said region of code is excluded from one or more effects of one or more register spill allocations and one or more compiler optimization decisions during a compilation associated with said mirror probe handler, and wherein said copy of said function being included in said mirror probe handler and said region of code being excluded from said one or more effects facilitate said referencing said first local variable automatically employing said one or more registers to access said first value.

20. The at least one program storage device of claim 19, said method further comprising:
  initializing a data structure associated with said mirror probe to include a first address associated with said first line of code of said mirror probe handler and a second address associated with said second line of code of said function; and
  placing said mirror probe in executable code of said function, wherein said placing associates said probe with said second address.

21. The at least one program storage device of claim 20, said method further comprising:
  modifying a program counter to include an address associated with said probing logic in response to returning from an execution of an exception handler, wherein said exception handler is executed in response to said executing said mirror probe, and wherein said program counter is a register of said plurality of registers;
  returning from said exception handler; and
  executing said probing logic responsive to said modifying said program counter and said returning, wherein, upon initiating said executing said probing logic, a state of said plurality of registers matches said state saved via said saving,
  wherein said referencing said first local variable accesses said first value during said executing said probing logic.

22. A method for deploying computing infrastructure, comprising integrating computer-readable code into a computing system, wherein the code in combination with the computing system is capable of performing a process of accessing, from a mirror probe handler, a value to be associated with an argument of a function in a computing environment, said process comprising:
  initiating an execution of a function by a processor, said function defined with a first prototype associated with a first set of one or more arguments, and said initiating providing at least part of a state of a plurality of registers of said processor, and a value to be associated with an argument of said first set,
  wherein at least part of said execution of said function is to be temporarily replaced by an execution of the mirror probe handler, the mirror probe handler defined with a second prototype associated with a second set of one or more arguments, the mirror probe handler associated with a mirror probe placed in a running program at the address of the entry point of the function to be probed,
  wherein said first prototype and said second prototype are identical, and
  wherein said state of said plurality of registers facilitates an access to said value;
  executing said mirror probe, responsive to said initiating said execution, said mirror probe being at least one instruction for temporarily replacing said at least part of said execution of said function;
  saving, responsive to said executing said mirror probe, said state of said plurality of registers;
  modifying a program counter to include an address associated with said mirror probe handler in response to returning from an execution of an exception handler, wherein said exception handler is executed in response to said executing said mirror probe, and wherein said program counter is a register of said plurality of registers;
  returning from said exception handler; and
  initiating execution of said mirror probe handler, said initiating responsive to said modifying said program counter and said returning, wherein, upon said initiating said execution, a state of said plurality of registers matches said state saved via said saving;
  referencing, during said executing said mirror probe handler, said argument of said second set to provide said access to said value, said referencing automatically employing at least one register of said plurality of registers to access said value, wherein said first prototype and said second prototype being identical facilitates said referencing automatically employing said at least one register to access said value; and
  after said referencing accesses said value, restoring said state saved via said saving, said restoring facilitating said at least part of said execution of said function, wherein said value is associated with said argument of said first set during said at least part of said execution.

23. The method of claim 22, wherein said process further comprises:
  initializing a data structure associated with said mirror probe to include a first address associated with said mirror probe handler and a second address associated with an entry of said function;
  and placing said mirror probe in executable code, wherein a part of said executable code includes said function, and wherein said placing associates said mirror probe with said second address.

24. The method of claim 22, wherein said process further comprises, if a stack-based calling convention is associated with said processor, and a frame pointer is associated with said processor and said mirror probe handler:
  initializing a data structure associated with said mirror probe to include a first address associated with said mirror probe handler and a second address associated with a line of code of said function; and
  placing said mirror probe in executable code of said function, wherein said placing associates said mirror probe with said second address,
  wherein said frame pointer is associated with a register of said plurality of registers, and
  wherein said register is to be employed to access said value.

25. The method of claim 24, wherein said process further comprises:
  determining a first value of said frame pointer during said execution of said function;
  determining a second value of said frame pointer during said executing said mirror probe handler;
  recording a difference between said first value and said second value; and
  adjusting for said difference to identify said at least one register to be employed by said referencing to provide said access to said value.

26. The method of claim 22, wherein said process further comprises:
  referencing, during said executing said mirror probe handler, a first local variable of said mirror probe handler to provide an access to a first value associated with said first local variable via said executing said mirror probe handler, said referencing said first local variable automatically employing one or more registers of said plurality of registers to access said first value,
  wherein said first value is to be associated with a second local variable of said function during said at least part of said execution of said function,
  wherein said state of said plurality of registers facilitates said access to said first value,
  wherein said mirror probe handler includes a copy of said function, wherein said copy of said function provides said first local variable as a copy of said second local variable, and a first line of code of said mirror probe handler as a copy of a second line of code of said function, wherein said mirror probe handler includes probing logic not included in said copy of said function, said probing logic being included in a region of code of said mirror probe handler inserted before said first line of code, wherein said region of code is excluded from one or more effects of one or more register spill allocations and one or more compiler optimization decisions during a compilation associated with said mirror probe handler, and wherein said copy of said function being included in said mirror probe handler and said region of code being excluded from said one or more effects facilitate said referencing said first local variable automatically employing said one or more registers to access said first value.

27. The method of claim 26, wherein said process further comprises:

initializing a data structure associated with said mirror probe to include a first address associated with said first line of code of said mirror probe handler and a second address associated with said second line of code of said function; and placing said mirror probe in executable code of said function, wherein said placing associates said probe with said second address.

28. The method of claim 27, wherein said process further comprises:

modifying a program counter to include an address associated with said probing logic in response to returning from an execution of an exception handler, wherein said exception handler is executed in response to said executing said mirror probe, and wherein said program counter is a register of said plurality of registers;

returning from said exception handler; and executing said probing logic responsive to said modifying said program counter and said returning, wherein, upon initiating said executing said probing logic, a state of said plurality of registers matches said state saved via said saving, wherein said referencing said first local variable accesses said first value during said executing said probing logic.

* * * * *